United States Patent [19]
Hillman

[11] 3,810,712
[45] May 14, 1974

[54] WIND POWERED MOTIVE APPARATUS
[76] Inventor: Edwin K. Hillman, 907 W. Desert Cove, Phoenix, Ariz. 85029
[22] Filed: Nov. 2, 1972
[21] Appl. No.: 303,232

[52] U.S. Cl. .............................. 416/117, 416/101
[51] Int. Cl. ............................................ F04d 29/36
[58] Field of Search ............................ 416/101, 117

[56] References Cited
UNITED STATES PATENTS

| | | | |
|---|---|---|---|
| 2,023 | 3/1841 | Hobday et al. | 416/101 |
| 22,884 | 2/1859 | May | 416/101 |
| 553,796 | 1/1896 | Di Vecchio et al. | 416/101 |
| 1,915,689 | 6/1933 | Moore | 416/117 |
| 2,006,024 | 6/1935 | Lockwood | 416/110 |
| 2,041,103 | 5/1936 | Zegers | 416/101 |
| 2,614,639 | 10/1952 | Richard | 416/101 |

Primary Examiner—Everette A. Powell, Jr.
Attorney, Agent, or Firm—Cahill, Sutton & Thomas

[57] ABSTRACT

A wind powered apparatus having a plurality of reciprocally pivotable centrally mounted members is disclosed. The extremities of each of these members support a vane. The two vanes of each member are set at right angles with respect to one another. In operation, the wind will engage, in turn, one vane of each of the members. As the vane is engaged, the force of the wind will tend to rotate the member. Rotation of the member will cause the engaged vane to pivot downwardly until it is normal to the force of the wind. The downward rotation of one vane will rotate the other vane upwardly whereby the other vane is parallel with the force of the wind. The disparate wind force on each of the opposed vanes on any given member will tend to cause the member to rotate about its mounting point. The rotation of the member about its mounting point will cause the mount itself to rotate.

8 Claims, 10 Drawing Figures

PATENTED MAY 14 1974 3,810,712

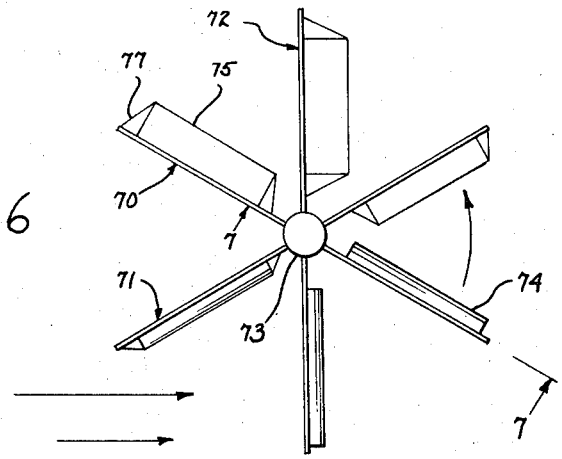
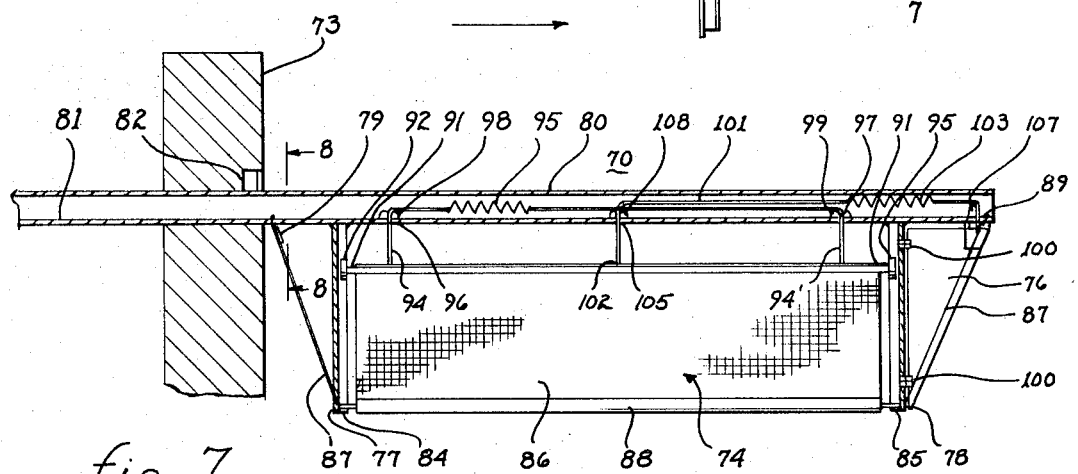
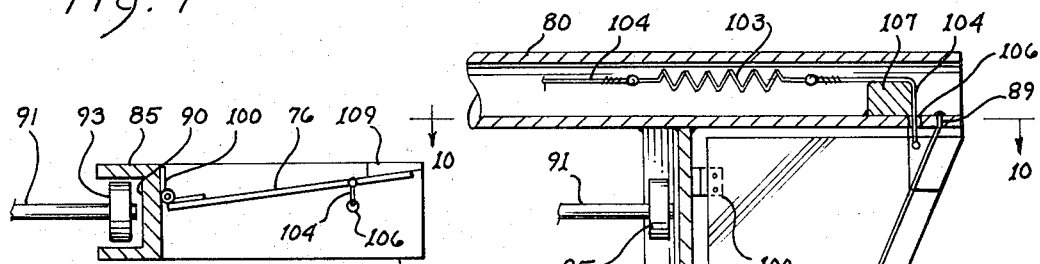
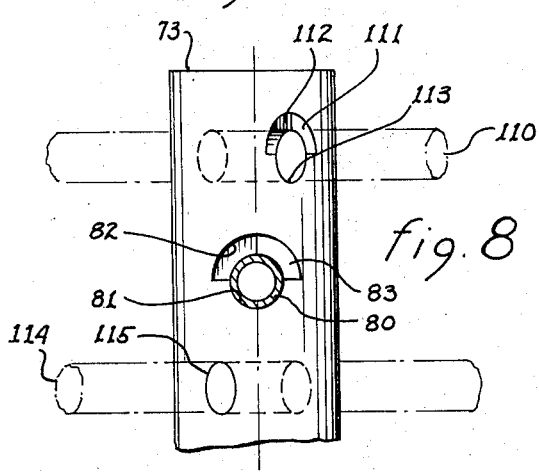
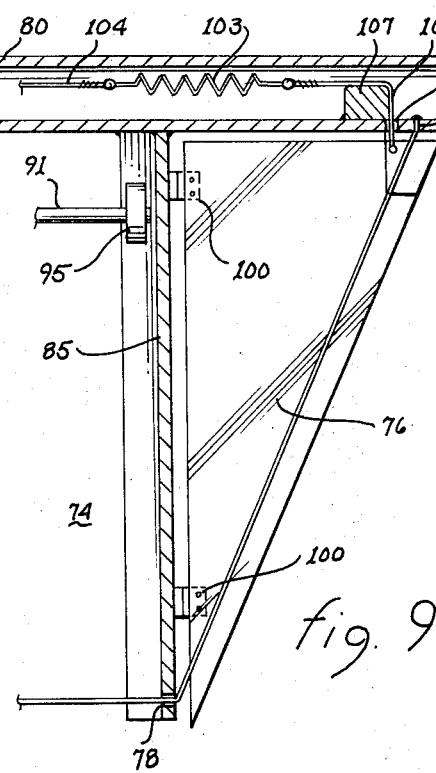

WIND POWERED MOTIVE APPARATUS

The present invention relates to apparatus for harnessing the force of the wind, and more particularly, to apparatus presenting a constantly varying surface area for engaging the wind.

Various devices have been used for many years to harness the energy available from the wind. One of the most common of these devices is that of a fan-mounted upon a derrick, generally referred to as a windmill. Usually, the fan includes a rudder-like member for positioning the fan normal to the eye of the wind. The structure and configuration of the fan are such that it is primarily intended for low rotational speed operation. The low rotational speed and high torque output lends this type of apparatus to be particularly suitable for connection to a reciprocating water pump. When so used, it is usually located at remote water holes for supplying water to cattle or other livestock. One of the primary disadvantages of this type of apparatus is that severe damage may occur to the fan or the operating mechanism during high wind conditions. Because of this disadvantage, the rudder-like mechanism is ususally manually pivotable so as to align the fan with the wind and thereby prevent the wind from causing the fan to rotate. To be effective, the apparatus must, of course, be within easy access to the operator and such is not often the case at remote locations.

Another distinct type of wind-driven apparatus is that in which the operative element rotates on a vertical axis. Generally, this type of apparatus includes a plurality of arms extending in a horizontal plane. A cup-like shaped wind engaging device is secured to the extremity of each arm. The devices are similarly oriented at the extremities of the arms with the result being that of one-half of the apparatus presenting a greater resistance to the wind than the other half. The disparate resistance to the wind causes the wind to react more strongly on one half of the apparatus than the other. The unequal reaction, in turn, causes the apparatus to rotate about its vertical axis. A typical example of this type of device is a wind speed measuring device known as an anemometer.

Variations on the above discussed types of wind-driven apparati have also been developed. One of the most notable developments is that of a device functioning similarly to an anemometer but having its arms either curved or dished whereby the wind coacts with one half of the apparatus with greater force than the other half. However, each of these types of apparatus include non-varying surface area elements extending from a hub, whether that hub be in the vertical or horizontal axis.

It is therefore a primary object of the present invention to provide a variable surface wind responsive power generator.

Another object of my invention is to provide a means fo varying the area of the surfaces subjected to the force of the wind as a function of the rotational position of the power generator.

A yet another object of the present invention is to provide a means for orienting the power generator with respect to the eye of the wind.

A still another object of the present invention is to provide means which eliminate the need for manually disengaging the power generator during high winds.

A further object of the present invention is to provide reciprocally pivoting vanes for varying the surface area engaging the wind.

A yet further object of the present invention is to provide a triggering device for pivoting the vanes as the vanes pass the eye of the wind.

A still further object of the present invention is to provide a variable camber vane, which camber is a function of the force of the wind.

These and other objects of the invention will become more readily apparent to those skilled in the art as the description thereof proceeds.

The present invention may be described with more specificity and clarity with reference to the following drawings, in which:

FIG. 6 illustrates a top view of the pivotable vane shown in FIG. 5.

FIG. 7 illustrates a frontal view of one of the vanes, taken along line 7—7 as shown in FIG. 6.

FIG. 8 illustrates the mounting post for mounting the vane supporting members, taken along line 8—8 as shown in FIG. 7.

FIG. 9 is a detailed view of the triggering vane for initiating rotation of the main vane.

FIG. 10 is a top view of the triggering vane, taken along line 10—10 as shown in FIG. 9.

Figure 1:
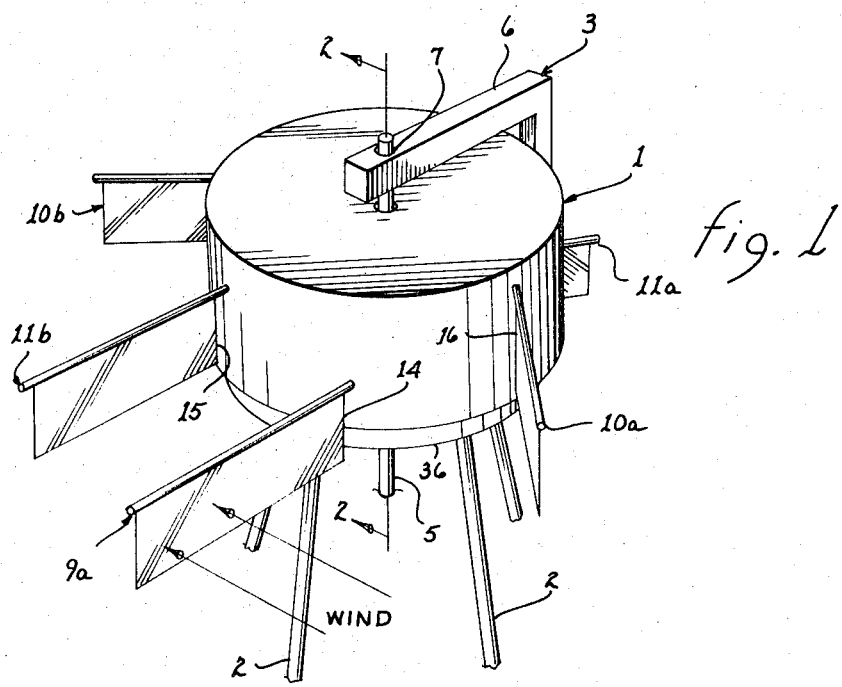
FIG. 1 illustrates an isometric view of the present invention.

In the following discussion describing the present invention, reference will be made to FIGS. 1 and 2. The present invention is supported above the ground by a plurality of supports 2 terminating at a pedestal 36. Pedestal 36 is circular and includes a circular bearing race 37 secured thereto, which race receives a plurality of bearings 38. A second circular bearing race 39 cooperates with race 37 to house bearings 38 therebetween. Leg 4 of the U-shaped frame 3 is secured to race 39 whereby the frame is relatively free to rotate with respet to pedestal 36.

Rotation of frame 3 is selectively accomplished by energization of an electric motor 40, the latter being secured to pedestal 36. The output shaft of motor 40 includes a gear 41. Gear 41 meshes with a plurality of gear teeth 42 disposed about the periphery of race 39. Thus, the positional relationship between frame 3 and pedestal 36 can be selectively determined by energizing motor 40 and causing gear 41 to rotate.

A housing 1 includes a circular top 30 and a skirt 31 extending downwardly therefrom. A plurality of slots, such as slots 14, 15, and 16, are disposed within skirt 31. These slots serve to guide the movement of a plurality of vanes, such as vanes 9a, 11b and 10a, respectively, into and out of housing 1.

One end of shaft 5 is journalled within leg 6 of frame 3 by journal 7. Similarly, the other end of shaft 5 is journalled within leg 4 by journal 58. Shaft 5 is also journalled within pedestal 36 by journal 57. Thus, shaft 5 is free to rotate with respect to frame 3 and pedestal 36. Shaft 5 is also journalled within the central part of top 30 of housing 1 by a bearing 8. Bearing 8 serves to position housing 1 in the vertical axes with respect to shaft 5. A support member 13 may be affixed to the central portion of top 30 to provide additional strength and prevent flexing or distortion of top 30. Thus, housing 1 is rotatably secured between legs 4 and 6 of frame 3 by shaft 5.

The central portion of shaft 5 includes three cranks 27, 28, and 29. The central portion of shaft 5 may be manufactured by conventional techniques for making crankshafts, or, the extremities of each of the cranks may be secured to one another by pins, such as pin 47 in crank 27, pin 48 in crank 28, and pin 49 in crank 29.

A shaft 21 is rotatably mounted within leg 4 and extends into housing 1. A sun gear 23 is secured to the lower extremity of the internal side of skirt 31. A gear 22 is fixedly secured to shaft 21 to mesh with gear 23. A second gear 24 is also fixedly secured to shaft 21 and positioned above gear 22. Gear 24 drives a gear 26, the latter being fixedly secured to shaft 5 through a chain 25.

Figure 2:
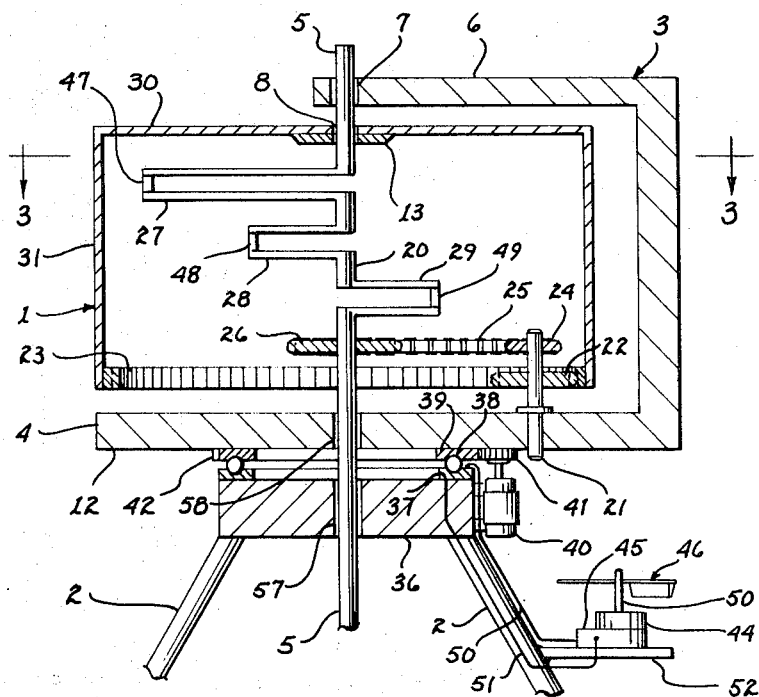
FIG. 2 illustrates a cross-sectional view of the present invention, taken along lines 2—2 as shown in FIG. 1.
Figure 3:
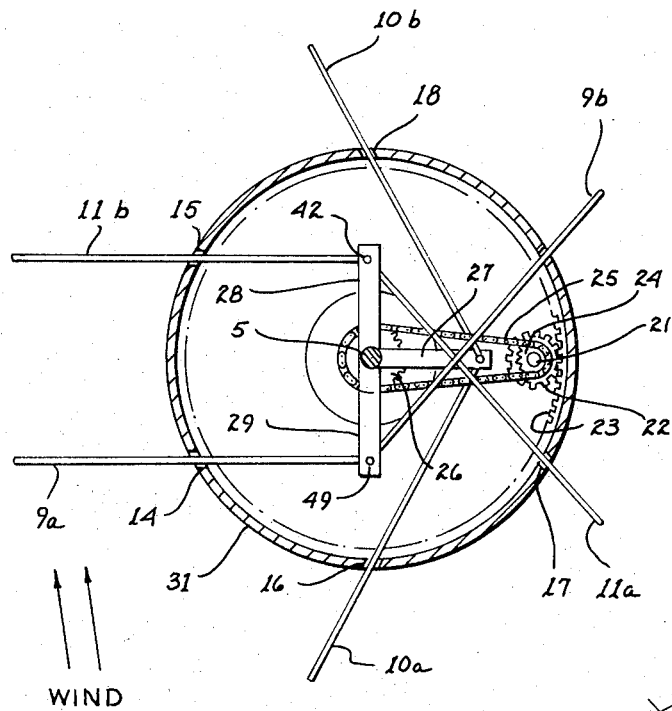
FIG. 3 illustrates a cross-sectional view of the present invention, taken along lines 3—3 as shown in FIG. 2.

Referring now jointly to FIGS. 2 and 3, the interaction of the component parts will be described in further detail. The previously discussed cranks 27, 28, and 29 are angularly oriented with respect to one another such that cranks 28 and 29 are disposed at 180° with respect to one another. Crank 27 is disposed at an angle of 90° with respect to cranks 28 and 29. The set of vanes 9a and 9b pivot about pin 49 of crank 29 and extend through skirt 31 through openings 14 and 19, respectively. A set of vanes 10a and 10b are pivotally secured to pin 47 of crank 27 and extend through skirt 31 through openings 16 and 18, respectively. The set of vanes 11a and 11b are pivotally secured to pivot 48 of vane 28 and extend through skirt 31 through openings 17 and 15, respectively. Although the vanes are shown to be planar, they may be dished to cooperate more efficiently with the wind.

Assuming for the moment that the wind is blowing in the direction as shown in FIG. 3, vanes 9a and 11b will be at an angle of 90° with respect to the wind. At this orientation these vanes will receive the full force of the wind acting upon them. The force of the wind acting upon blades 9a and 11b will tend to force the vanes to travel with the wind. The force acting upon the vanes will, in turn, act upon slots 14 and 15 of skirt 31, tending to cause skirt 31 to rotate about its central point, shaft 5. The rotation of skirt 31 will permit blades 9a and 11b to move with the wind. Simultaneously, the teeth of bull gear 23, engaging gear 22, will cause gear 22 to rotate. Rotation of gear 22 causes gear 24 to rotate as the two are attached to shaft 21, which shaft is free to rotate. Rotation of gear 24 causes gear 26 to rotate by means of chain 25. Rotation of gear 26 causes shaft 5 to rotate. Rotation of shaft 5 will be at a higher rate than the rate of rotation of housing 1 because of the gear rations used. The resultant rate of rotation of shaft 5, and hence cranks 27, 28, and 29, with respect to housing 1 will cause each respective crank to withdraw one of its attached vanes while extending the other attached vane as the crank rotates with respect to skirt 31. The gear ration discussed above and the orientation of the cranks and gears is selected such that the maximum vane extension always occurs at a point diametrically opposite to shaft 21. Hence, the minimum-extension will occur at a point adjacent shaft 21. The net result of the extension and retraction of each of the vanes will be that of presenting a maximum frontal area to the wind at a point diametrically opposite to shaft 21 while presenting a minimum frontal area at a point adjacent shaft 21. The disparity of force exerted by the wind on opposite sides of housing 1, causes the housing, the vanes extending therefrom, and ultimately shaft 5 to rotate in response to the wind. Thus, the rotating shaft 5 represents a source of power output of the present invention. The shaft 5 may be connected to any type of device, such as an electric generator to generate electricity.

The different rotational speed of crank 28 to that of skirt 31 causes each of the vanes to be alternately retracted within and extend out of skirt 31. The resulting envelope described by the extremities of each of the vanes is shaped similar to that of a tear drop where the tear drop is aligned normal to the direction of the wind. As described above, the substantially greater area of the path of the wind on one side of shaft 5 results in a disparity of forces causing rotation of housing 1.

The maximum power output of the present invention will occur when housing 1 is oriented such that the point diametrically opposite shaft 21 is normal to the direction of the wind. As the wind frequently changes direction, it is necessary to provide a mechanism for reorienting housing 1 in response to wind changes.

As discussed above, the best efficiency is obtained from the present invention when the frame 3 is normal to the direction of the wind, hence causing the maximum vane extension to also be normal to the direction of the wind.

The position of frame 3 is controllable by motor 40 acting through gears 41 and 42. The power for motor 40 may be obtained from a storage battery or may be taken from an electric generator connected to output shaft 5. The determination of the wind direction can be obtained from a simple pivotable vane, A sensor, responsive to the position of both the vane and frame 3, may be used to selectively energize motor 40 to position the frame in response to wind changes.

In order to insure that frame 3 is free to rotate even under light wind conditions, it is necessary that bearings 38 disposed within races 27 and 39 be well lubricated. Continuous lubrication of bearings 38 may be easily accomplished by a secondary set of vanes 46 driving a small oil pump 44 mounted on a platform 52. Vanes 46, rotating in response to the wind, cause shaft 50 to rotate. Shaft 50 is operably connected to the oil pump, the latter pumping oil from reservoir 45 through oil line 50. Oil line 50 terminates within race 37 and oil flowing therefrom bathes bearings 38 in oil. A return oil line 51 is connected between race 37 and reservoir 45 to prevent an overflow of oil within race 37 and to also permit a continuous oil flow.

Figure 4:
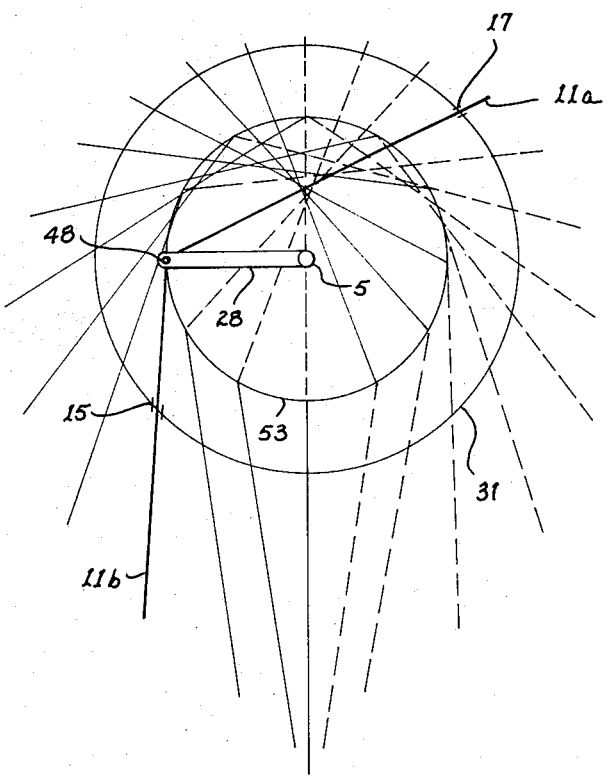
FIG. 4 illustrates various positions of a pair of vanes as the housing rotates.

Referring now to FIG. 4, there is shown a functional diagram of the movement of one set of blades, 11a and 11b. Crank 28 will pivot about a pivot point represented by shaft 5 and scribe a circle 53. Each of the vanes 11a and 11b extend from pivot 48 through their respective apertures 17 and 15 in skirt 31.

The set of vanes 46 include three individual pairs of vanes 70, 71, and 72. Each of these pairs of vanes are rotatably mounted within a mounting member 73. Each of the pair of vanes includes two vanes, such as vanes 74 and 75 of pair of vanes 70, mounted at 90° to one another. Each of the individual vanes, such as vanes 74 and 75, includes a triggering vane, such as vanes 76 and 77, respectively, secured to the extremity thereof.

Figure 5:
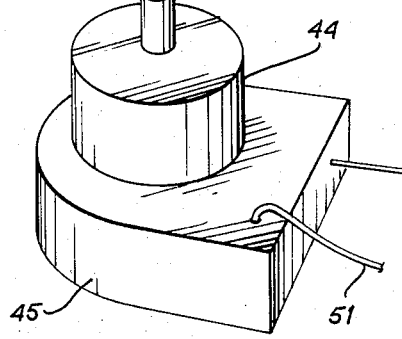
FIG. 5 illustrates a pivotally mounted vane assembly for providing power to a lubricating pump.

The fundamental operation of set of vanes 46 will be described with respect to FIGS. 5 and 6. Each pair of vanes pivots within mounting member 73 such that one of the pair of vanes pivots downwardly to intercept the wind. Simultaneously, the other vane of the pair of vanes pivots upwardly to a horizontal position to present minimum resistance to the wind. The point at which the pivoting of the set of vanes occurs is the point at which one of the vanes of the pair of vanes passes through the eye of the wind. At this point, the downward pivoting of the upwind vane presents an increased surface area to the wind. The force of the wind acting upon the upwind vane will continue to pivot the upwind vane downwardly until the vane reaches a stop. Simultaneously, the pivoting upwind vane will pivot the downwind vane to a horizontal position. Thus, the maximum frontal area is presented to the wind by one half of the set of vanes while the other half of the set of vanes presents a minimum frontal area to the wind. The disparity of wind force acting upon each half of the set of vanes causes the set of vanes to rotate mounting member 73, and, of course, shaft 50.

To initiate and aid in the initial pivoting of the pairs of vanes, a triggering vane is set at an angle with respect to the appended vane when the triggering vane passes through the eye of the wind. The angular difference tends to cause the triggering vane to intercept the force of the wind prior to the main vane intercepting the force of the wind. The force of the wind acting upon the triggering vane will initiate the downward rotation of the appended main vane.

The construction of the vanes will be described in reference to FIGS. 7, 8, 9, and 10. For illustrative purposes, vane 74 of pair of vanes 70 is shown. A pipe 80 extends through aperture 81 within mounting member 73 and is common to both vanes, 74 and 75. A semicircular cavity 82 within mounting member 73 extends about pipe 80 to receive dog 83, the latter being attached to the pipe. Dog 83, rotating within cavity 82, limits the rotation of pipe 80 within aperture 81 to an angle of 90°. Two channeled supports 84 and 85 are secured to and extend downward from pipe 80. A guide wire 87 is secured to point 79 of pipe 80 and extends therefrom through aperture 77 in support 84, through aperture 78 in support 85, and is secured to pipe 80 at point 89. One end of a flexible membrane 86 is secured to guide wire 87 intermediate supports 84 and 85. The method for securing membrane 86 may be that of a simple sleeve 88 receiving the guy wire 87, or the membrane may be spring-mounted on the guy wire in the nature of a window roller shade. The opposite side of membrane 86 is secured to a rod 91. Rod 91 is free to move in the axes of supports 84 and 85 by means of a pair of wheels 92 and 93 engaging the channels within the respective supports. In example, FIG. 10 illustrates wheel 93 mounted upon rod 91 and disposed within channel 90. Rod 91 is biased toward pipe 80 by a pair of cables 94 and 94'. Each of these cables (94 and 94') extend through apertures 96 and 97, respectively, and are supported by guides 98 and 99 respectively within pipe 80. The two cables are connected in tension by means of a spring 95.

The constructional features and operation of the triggering vane 76 will be described with reference primarily to FIG. 9. Triggering vane 76 is hingedly secured to support 85 by means of a pair of hinges 100. by this means, triggering vane 76 is free to pivot between constraints to be described. A magnet 109 extends downwardly from pipe 80 off center of the longitudinal axes of the pipe. (See FIG. 10). Triggering vane 76, which may be of magnetically responsive sheet material or which may have a magnetically responsive element disposed in proximity to magnet 109, is attracted to and tends to pivot toward magnet 109. A cable 104 is secured to the approximate top side and outward extremity of trigger vane 76. Cable 104 is inserted within pipe 80 through aperture 106 and is guided therein by guide 107. Aperture 106 within pipe 80 is approximately aligned with the plane of membrane 86. A further cable 101 is secured to rod 91 at point 102 and is inserted within pipe 80 through aperture 105. Cable 101 is guided within pipe 80 by guide 108. A spring 103 connects cables 104 and 101 and maintains the cables in tension.

From the above description, it will be apparent that triggering vane 76 will be attracted toward magnet 109, which attraction, if manifested by movement of the triggering vane, will angularly displace the triggering vane with respect to membrane 86. Whether or not triggering vane 76 will be displaced is a function of spring 103. If the force exerted by spring 103, through cables 104 and 101, is of sufficient magnitude, cable 104 will tend to align triggering vane 76 with aperture 106, resulting in alignment between triggering vane 76 and membrane 86. The force exerted by spring 103 is of course a function of the position of rod 91 with respect to pipe 80. When membrane 86 is taut, in response to the force of springs 95, rod 91 will be in closest proximity to pipe 80. At this point, spring 103 does not exert sufficient force on triggering vane 76 to prevent the vane from responding to the magnetic force of magnet 109. However, when membrane 86 becomes bowed, spring 95 will give and permit rod 91 to be displaced away from pipe 80. The increased force exerted on spring 103 by the movement of rod 91 will increase the force exerted on triggering vane 76 by cable 104. The increased force on triggering vane 76 will, in turn, pivot the vane until it is in alignment with aperture 106.

The previously presented summary of the operation of the pair of vanes 70 will now be expanded. When a vane, such as vane 74, extends downwardly into the path of the wind, the wind will tend to bow membrane 86 (see FIG. 6). The bowed membrane will increase the force applied by spring 103 on triggering vane 76. The increased force on triggering vane 76 through cable 104 will align the vane with pipe 80. Thereby, the maximum surface area is presented to the wind. As vane 74 rotates to the downwind side, the force of the wind on membrane 86 decreases and spring 95 will tend to raise rod 91 toward pipe 80. As rod 91 moves toward pipe 80, the force exerted by spring 103 on triggering vane 76 will steadily decrease as a function of the position of the rod. The decreasing force exerted on triggering vane 76 permits the triggering vane, at some point, to respond to the force of magnet 109. When this point occurs, triggering vane 76 will respond and pivot out of alignment with membrane 86.

When vane 74 is downwind of mounting member 73 is will pivot upwardly because of downward pivoting of vane 75 in the eye of the wind. When vane 74 pivots upwardly, dog 83 rotates within cavity 82 until further rotation is restricted. At the extremity of rotation of dog 83, vane 74 is approximately horizontal and trails pipe 80. The continuing rotation of pair of vanes 70 about mounting member 73 will ultimately bring vane 74 into the eye of the wind.

The horizontal orientation of vane 74 presents little surface area upon which the wind can act. However, triggering vane 76, previously positioned by magnet 109, now slants downwardly into the eye of the wind. The downward slant of triggering vane 76 does present a meaningful surface area upon which the wind may exert a force. The force of the wind upon triggering vane 76 will tend to rotate the triggering vane about pipe 80. As soon as triggering vane 76 beings to rotate downwardly in response to the force of the wind, membrane 86 will also begin to rotate downwardly. The downward rotation of membrane 86 will cause the membrane to immediately engage the wind. The wind will then act upon membrane 86, causing it to rotate further downwardly until dog 83 is restricted from further movement within cavity 82. Simultaneously, vane 75 rotates upwardly. At this point, the force exerted on membrane 86 will be translated through supports 84 and 85 to pipe 80 and cause the pipe to exert a rotational force on mounting member 73. Mounting member 73 will respond to the rotational force and continue to rotate, which rotation is transmitted to oil pump 44 through shaft 50.

Although the movement and function of only a single vane of one pair of vanes has been described in detail, it is to be understood that each vane of each pair of vanes operates in a similar fashion. Similarly, each of the other pairs of vanes, 71 and 72 include pipes 110 and 114, respectively (See FIG. 8), mounted within apertures 113 and 115, respectively, in mounting member 73. A cavity partially surrounds each pipe within mounting member 73, and a dog, secured to each pipe, is positionable therein, such as dog 111 secured to pipe 110 positionable within cavity 112.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. Apparatus for utilizing the force of the wind to drive a rotatable output shaft, said apparatus comprising:
   a. a mounting member secured to said output shaft, said mounting member including a plurality of diametrically oriented apertures extending therethrough;
   b. a plurality of pipes, one of said pipes engaging each said aperture and extending laterally in opposite directions;
   c. rotational restraining means mounted intermediate each of said pipes and the respective one of said apertures for limiting the rotation of said pipes from a first position to a second position where said second position is displaced from said first position by an angle of 90°;
   d. first and second vane means depending from opposite ends of each of said pipes, said first and second vane means being oriented at an angle of 90° with respect to one another about the axis of said pipe;
   e. said rotational restraining means and said first and second vanes associated with each said pipe being oriented such that said first vane is aligned with said output shaft when the respective one of said pipes is in said first position and said second vane is aligned with said output shaft when the respective one of said pipes is in said second position; and
   f. a pivotable triggering vane depending from the extremity of each of said pipes and normally aligned therewith for urging pivotal movement of the respective one of said pipes from said second position to said first position as said triggering vane passes through the eye of the wind by pivotally deflecting to present a greater area to the wind, said triggering vane including bias means for uging said triggering vane into alignment with the respective one of said pipes when the deflecting force of the wind is diminished; whereby, each of said triggering vanes urges pivotal movement of the respective one of said pipes as said triggering vane passes through the eye of the wind, which pivotal movement aligns the upwind one of said vanes with said output shaft to engage the wind with a maximum surface area while said downwind one of said vanes simultaneously pivots to a position normal to said output shaft to present a minimum surface area to the wind.

2. The apparatus as set forth in claim 1 wherein each of said first and second vanes includes:
   a. a pair of supports aligned with one another and extending normal to the respective one of said pipes;
   b. a flexible membrane supported intermediate said pair of supports; and
   c. tension means for maintaining said flexible membrane taut.

3. The apparatus as set forth in claim 2 wherein said bias means is operatively connected to said tension means; whereby, the bias force acting upon said triggering vane is inversely proportional to the tautness of said flexible member.

4. The apparatus as set forth in claim 3 wherein each said triggering vane is hingedly mounted to one of said pair of supports.

5. The apparatus as set forth in claim 4 wherein each said triggering vane is formed as a non-flexible member.

6. The apparatus as set forth in claim 3 including means extending intermediate the extremity of said pair of supports for mounting one edge of said flexible membrane.

7. The apparatus as set forth in claim 6 further including guide means disposed intermediate said flexible member and each of said pair of supports.

8. The apparatus as set forth in claim 1 wherein said rotational restraining means comprises a cavity disposed within said mounting member and a dog extending from said pipe into said cavity.

* * * * *